US007869718B1

(12) United States Patent
Sao et al.

(10) Patent No.: US 7,869,718 B1
(45) Date of Patent: Jan. 11, 2011

(54) POWER MONITORING PHOTO EYE CONTROLLER

(75) Inventors: Vinay Sao, Bryn Mawr, PA (US); Krishnaraj N. Tejeswi, Exton, PA (US); Gary Leigh, Kennett Square, PA (US); Bearge Miller, West Chester, PA (US)

(73) Assignee: Miller Edge, Inc., West Grove, PA (US)

( * ) Notice: Subject to any disclaimer, the term of this patent is extended or adjusted under 35 U.S.C. 154(b) by 630 days.

(21) Appl. No.: 11/998,336

(22) Filed: Nov. 29, 2007

(51) Int. Cl.
*H04B 10/04* (2006.01)
*H04B 10/00* (2006.01)

(52) U.S. Cl. ....................................... 398/191; 398/151

(58) Field of Classification Search ................. 398/151, 398/191
See application file for complete search history.

(56) References Cited

U.S. PATENT DOCUMENTS 5,625,980 A * 5/1997 Teich et al. .................... 49/26
6,693,273 B1 * 2/2004 O'Connor et al. ........... 250/221

* cited by examiner

*Primary Examiner*—Shi K Li
(74) *Attorney, Agent, or Firm*—Robert B. Famiglio, Esquire; Famiglio & Associates

(57) ABSTRACT

A wireless, automatic door obstruction detection system for protecting a motorized door or gate by signaling various hazardous conditions and reacting to said conditions by signaling control means. The invention utilizes wireless infrared emitter, receiver and controller apparatus. Infrared pulse timing data is sent as pulse repetition rate changes depending upon battery condition. In a preferred embodiment of the invention, the photoelectric transmitter emits timed pulse groups to present control information differentiating between a good battery and a low battery condition in the wireless transmitter. A wireless photoelectric transmitter extends the time period between pulse groups to indicate a low battery condition. A low battery condition signaling thereby presents a low power drain condition allowing for an extended period of low battery condition signaling.

6 Claims, 5 Drawing Sheets

Wireless Photo-Eye Transmitter Pulse Repetition

POWER MONITORING PHOTO EYE CONTROLLER

BACKGROUND OF THE INVENTION

1. Field of the Invention

The present invention relates generally to automatic door and gate systems, and more particularly to automatic door safety systems which detect hazardous conditions, obstructions and adjusts operating controls accordingly.

2. Related Art

Systems which control gates and motorized doors have been well-developed in commercial and residential applications. Systems which control doors and gates typically comprise a motorized system which opens and closes the gate or the door upon command such as when a switch is activated or a motion detector senses the arrival of a vehicle in a predetermined area. Such systems often include additional devices and apparatus which assist in the utility or safety of the systems so disposed.

The ubiquitous form of automatic door systems as for home garages or warehouse entry and exit doors or large overhead doors for commercial buildings usually have a transmitter and receiver allowing the doors to be opened remotely when approaching the door. Other systems may have sensors such as proximity sensors, light beams, pressure sensors or the like that automatically close or open doors for safety reasons or for convenience.

Existing systems have had safety means to provide that the gate being operated or the door being closed react should there be a person or other obstruction in the path of the moving gate or door. If a person or a car moves into a moving garage door's path as the door is being closed, the system should sense this condition, thereby allowing the door to stop or reverse itself preventing damage or injury.

Many of the existing systems use some type of device which monitors the visual path across the threshold to be protected such as may be the case with light beams which are used to allow continuous monitoring of a desired path. It would be appreciated that a continuous light beam would be obstructed, even momentarily, by a person walking through the beam or a vehicle blocking the complete path of the light beam. Many photoelectric systems such as described use either visible light or more commonly infrared light to monitor the obstruction path to be protected.

In many instances it is inconvenient or impractical to use wired control or power supply lines between a detector and the photo emitter to supply power or otherwise integrate the system components. Wired systems or electromechanical connections are frequently subject to potential failures from component fatigue induced by physical stress. Safety devices which are put in place to prevent possible injury or damage should always be operating properly to identify such problems and to take the appropriate actions such as to reverse a motor or to stop the action of a control system. If a hazard or obstruction warning or sensing device is not functioning properly, a door or gate may continue to close regardless of whether the obstruction is encountered potentially causing damage or injury and must be avoided with present day safety requirements as they are. Since many systems use hard wired control systems to connect the sensors, part of the system vulnerability is the breaking of wires or the inadvertent disconnection of the control wiring during operation of the equipment or otherwise.

There are also wireless devices now available and deployed which provide for control information to be transmitted or received without direct connection by a hard wired device. Short range wireless systems require batteries. When a battery system is deployed in such a safety device, it is desirable to have as much warning as possible that the battery device being deployed has been depleted so that the system battery can be renewed prior to complete failure of the system. Systems deployed today utilizing batteries could fail if the battery is being depleted to transmit a low battery condition in a wireless control scenario. It would be desirable to deploy wireless obstruction sensing control systems that would be able to provide a long term, low battery condition indication without causing the battery drain from the signaling of the low battery condition to add to the already depleted battery.

SUMMARY OF THE INVENTION

The present invention provides an automatic door control system for operating a gate or a door which detects and causes the door to react to obstructions or other hazardous conditions which block a control beam. The invention is comprised of a battery operated wireless infrared light emitter, an infrared light receiver and a control system means integrated into the receiver with one or more of the transmitter or receiver components all disposed to operate in a wireless environment. The wireless transmitter unit utilizes batteries for power and can sense obstructions a distance of thirty feet from the transmitter to the receiver.

A low battery indication is provided wirelessly from the transmitter utilizing a signaling protocol to provide warnings of a low battery condition before the transmitter battery power source has been depleted. Signaling of a low battery condition is continuous to enhance the safety of the device and provisions are provided to change the operating condition of the transmitter such as to be as little a drain on the battery as practical during a low battery condition so that power remains available for as long, as possible in the low battery condition sensing control state.

A photoelectric safety sensor applying wireless connections for use with an automatic door control system has an infrared transmitter, an infrared receiver and control means all of which act in detecting obstructions blocking the operation of a motorized door or gate. The system detects disruption between the infrared transmitter and receiver, thereby detecting interfering objects in the path of the moving door or gate being protected.

The system disclosed includes a controller integrated with an infrared receiver and a wireless transmitter which easily mounts to a specified height above the floor or grade level to provide protection to the threshold as desired. The invention is based on through-beam technology. When the infrared beam is blocked by an obstruction, the receiver sends a signal to the operator control system to stop and reverse the motion of the door or gate being protected.

The system's safety is enhanced through the use of a low battery signaling means integrated in the infrared transmitter to allow for the placement of the transmitter into a lower power consumption state at the same time signaling a low battery condition. The invention provides for extended operation of a wireless transmitter to provide for an extended period of time under which the transmitter can operate in a low battery condition by changing the signaling information data rate to reduce transmitter power consumption. The difference in signaling data rate also is used as the indicator for the signaling of low battery condition. An improvement of the invention is comprised of a change of signaling state in the transmitter from a first state to a second state depending on battery voltage. A first state has a higher repetition rate and duty cycle indicating good battery voltage. A second state of the transmitter increases the time between group pulse periods, reducing duty cycle and otherwise providing a positive indication of the change of state from the first condition to a second condition, all depending on battery voltage.

A transmitter unit incorporated in the present invention is a battery operated wireless infrared emitter with low battery indication provided over the wireless communications means while being useful for sensing obstruction over a distance of thirty (30) feet while maintaining a minimum battery life of one year. Infrared controller/receiver means includes a microprocessor-based externally powered system which detects the infrared pulses from the transmitter emitter unit and controls the operation of the motorized door or gate. When the system detects an obstruction in receiving the infrared light, the receiver controller sends a control signal to the operation means to stop and open the door gate. The receiver/controller also includes a low battery indicator buzzer which is activated when the transmitter emitter signals a low battery condition.

The benefits of the invention include the lack of control wires to install the infrared transmitter or emitter means which reduces installation time while providing for low battery maintenance because of extended battery life incorporated into the design of the unit. The unit features beam alignment indicators to help a user install the transmitter and receiver unit and locate an optimal sighting line for defining the unobstructed path to be used for the infrared beam.

DETAILED DESCRIPTION OF THE INVENTION

Figure 1:
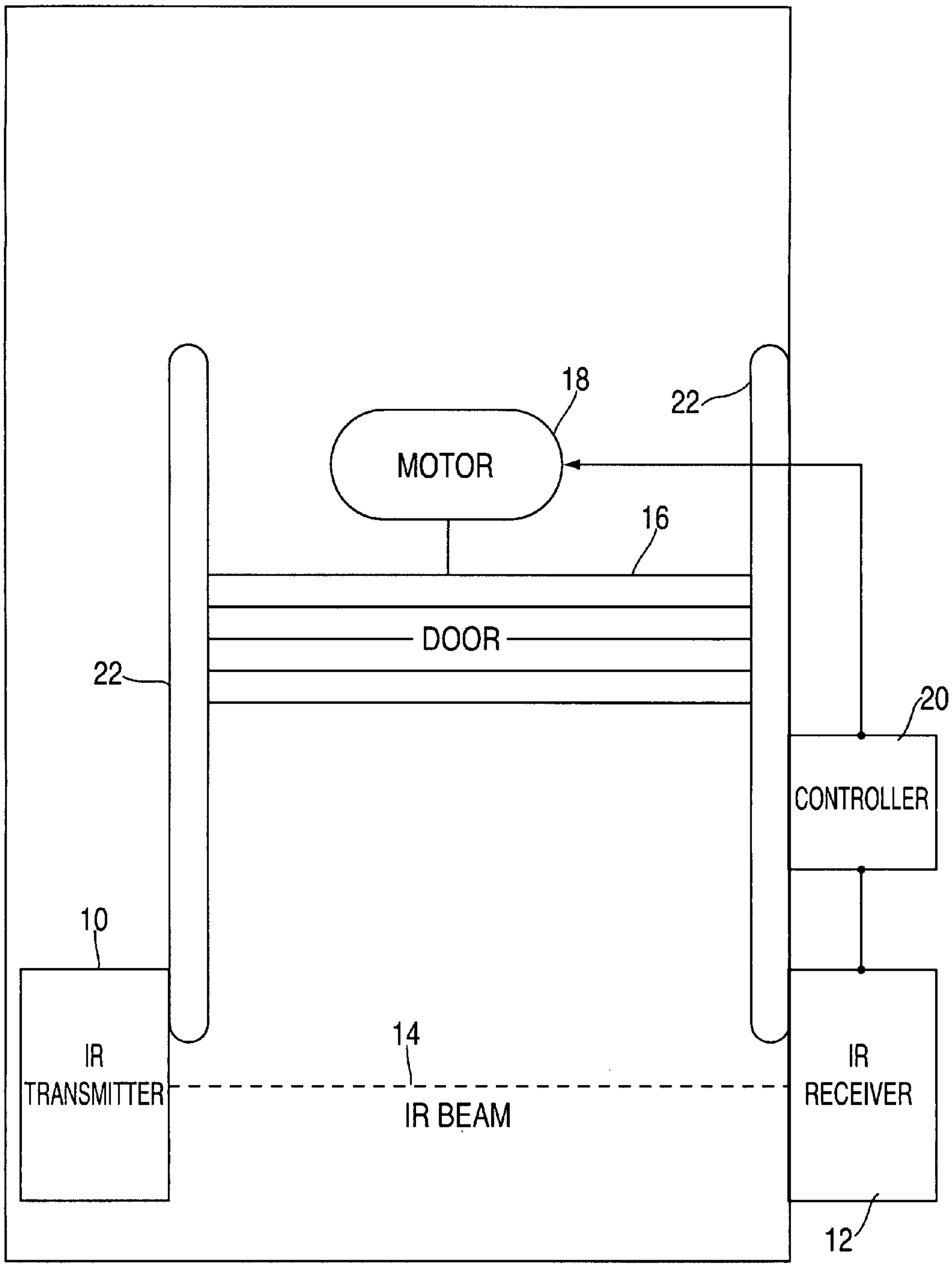
FIG. 1 is a diagrammatic system overview showing system components in an embodiment of the invention utilized to protect a motorized door.

The invention will now be described with reference to the various figures wherein like numbers refer to like parts. FIG. 1 is a schematic representation of the invention showing an application as a safety system for a typical motorized overhead garage door opener. A typical system in which the preferred embodiment of the invention is applied includes a movable overhead door 16 which moves vertically riding on door tracks 22. Typically motor 18 is operatively connected to door 16 providing motion to open and close door 16 upon command. Typically in motor 18, a controller 20 is either integrated into the motor control systems found in present day electric motors or is contained separately in a remotely located control system attached, for example, on a wall or near a manual activator button such as to command opening and closing door 16.

In the present invention it is desired to monitor obstructions in the path of door 16 utilizing an infrared ("IR") beam 14. Infrared beam 14 originates from transmitter 10 sending a directional infrared light beam to receiver 12. It will be appreciated by those skilled in the art of garage door technology that light beams, whether visible light or infrared wavelength light should be continuously generated such as to be in operation to verify the unobstructed path of beam 14 if door 16 is commanded to move, particularly in the downward direction.

The present invention provides for a unique system to allow transmitter 10 to be wireless and fully battery operated while allowing a long battery lifetime. It will be appreciated that transmitter 10, while being wireless, would still need to be transmitting infrared beam 14 on a continuous basis in order to be assured that any obstruction in the path of door 16 would be sensed in a timely fashion. In a wired environment where power conservation is not an important consideration, it would be desirable to allow transmitter 10 to transmit continuously rather than command transmitter 10 into an on or off mode depending on the operation of door 16. IR beam photoelectric receiver 12 runs continuously as being hardwired to a power source and to controller 20 which communicates with receiver 12 as depicted in the example in FIG. 1.

Because an objective of the invention is to allow extended battery life in transmitter 10 without cycling the transmitter between an on, off or dormant state, a control system is necessary to allow for extended battery life of the transmitter and to further provide for positive signaling of a low battery condition to enhance safety.

Figure 2:
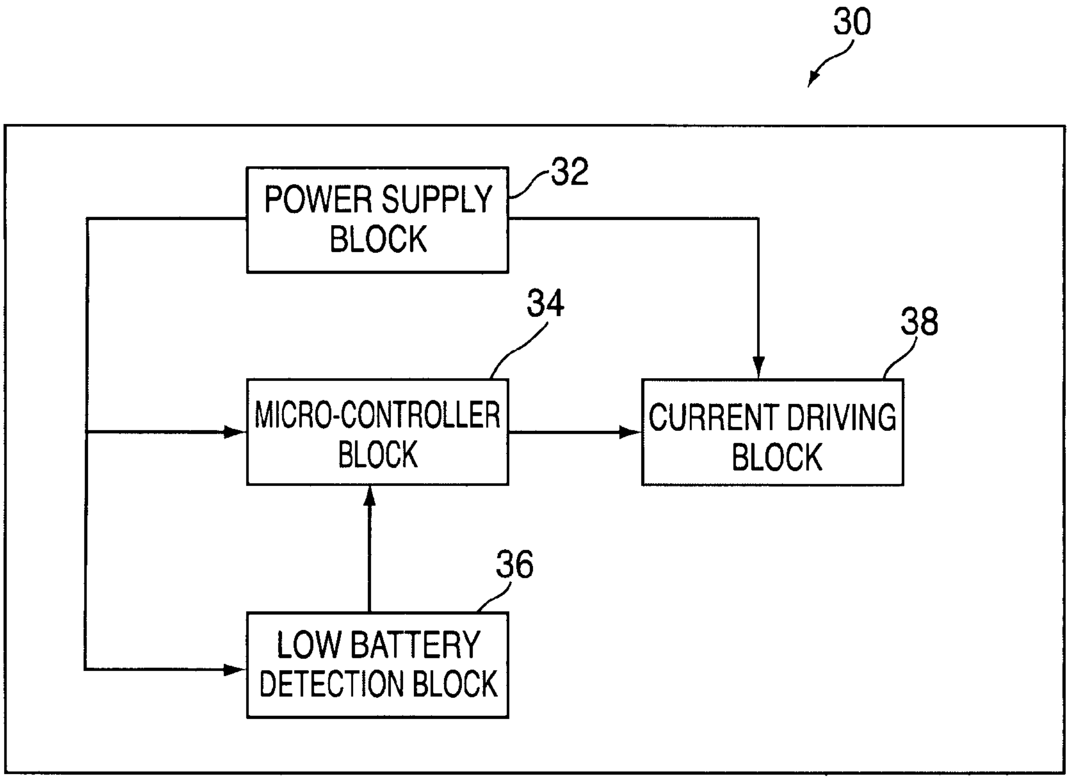
FIG. 2 is a block diagram of the transmitter portion of the wireless photo eye system.

Turning to FIG. 2, a block diagram of the system which controls infrared wireless transmitter 10 is shown. Wireless transmitter system 30 is comprised of power supply means 32, microcontroller means 34, low battery detection means 36 and current driving means 38.

Transmitter system 30 is contained within transmitter 10. Transmitter 10 is stationary and mounted at a specific height above floor or grade level opposite side of the area to be protected between transmitter 10 and receiver 12. In a preferred embodiment, transmitter 10 emits an infrared beam of a wavelength of 940 nm. A different infrared wavelength may be employed with good results if desired. Transmitter 10 and receiver 12 can be aligned when being placed into service by having a locally installed LED or some other indicator which describes continuity when IR beam 14 is in place between the correct sensors in transmitter 10 and receiver 12.

Figure 3:
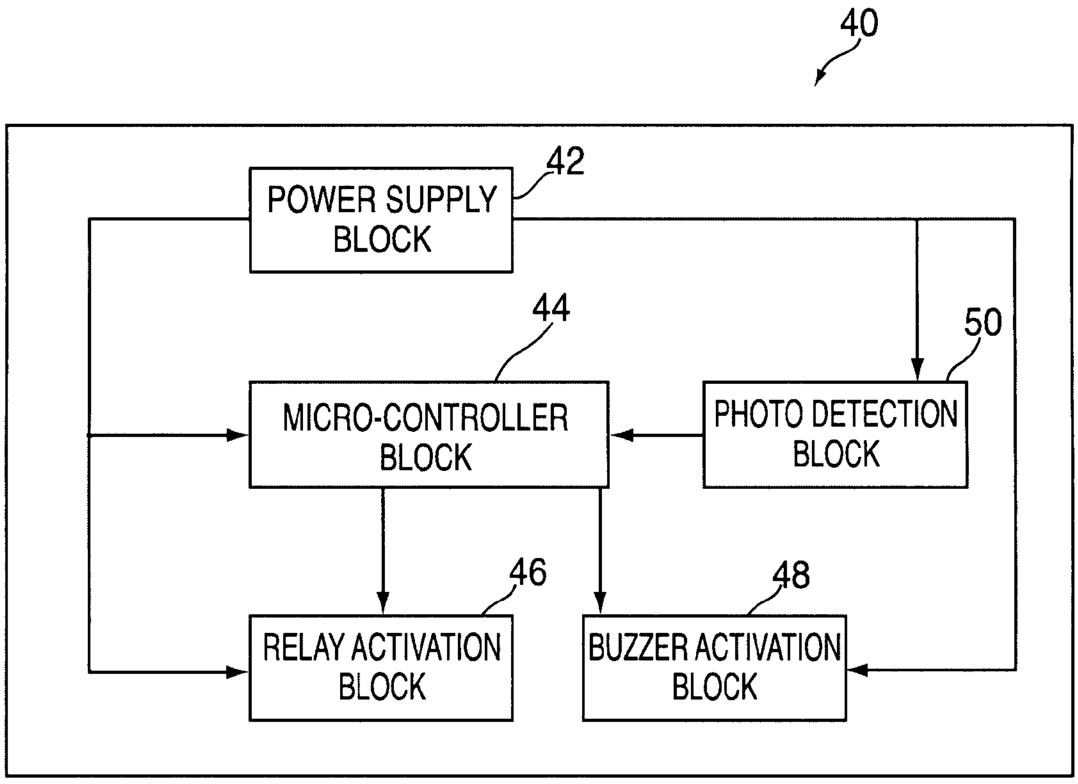
FIG. 3 is a diagram of the receiver and controller portion of the wireless photo eye system.

Receiver 12 is comprised of receiver system 40 as shown in FIG. 3. System 40 is comprised of power supply means 42, microcontroller means 44, relay activation means 46, a buzzer or other indicator means 48 and photo detection means 50.

Figure 4:
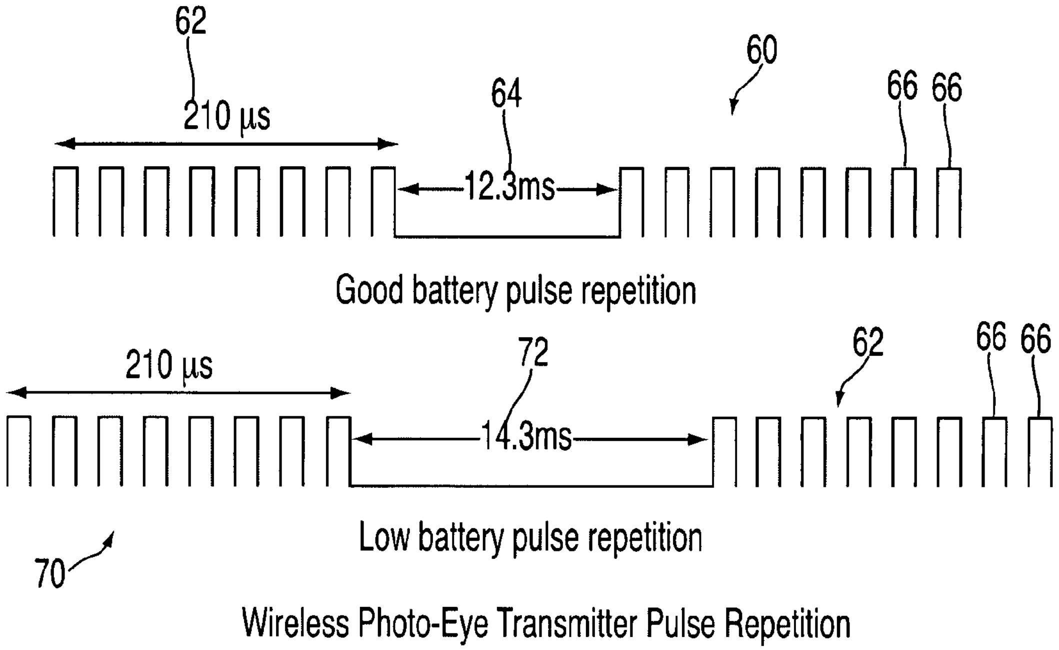
FIG. 4 is a timing diagram illustrating the wireless photo eye transmitter pulse repetition rate and the differences in the timing given the condition of the batteries.

Transmitter 10 uses microcontroller means 34 to generate infrared bursts of eight (8) pulses with time differences of either 12.3 milliseconds or 14.3 milliseconds between the groups of bursts 62 as shown in FIG. 4. Infrared light that defines beam 14 is generated by an infrared LED which does not produce a continuous light beam, but rather provides said burst of 8 infrared pulses in a group in order to minimize battery consumption while having sufficient duty cycle to essentially provide continuous obstruction coverage of the path defined by beam 14. In a preferred embodiment, the time difference between the bursts is generated by transmitter 10 depending on transmitter system 30 within transmitter 10 depending on the battery voltage providing power to transmitter system 30 within transmitter 10. If the battery in transmitter 10 is above a defined threshold voltage, the time difference between said pulse groups of eight (8) pulses is 12.3 milliseconds. When the battery voltage within transmitter 10 is below a defined threshold voltage, the time delay between pulse groups 62 is 14.3 milliseconds.

Transmitter system 30 uses two system frequencies. A frequency of 125 KHz and 4 MHz. A frequency of 4 MHz is used for generating the pulse. The remainder of microcontroller means 34 runs on a clock frequency of 125 KHz. By running the microcontroller means 34 at the lower frequency, the total current consumption of microcontroller means 34 is reduced and therefore the internal battery will last longer.

One advantage of the invention is realized by decreasing the battery duty cycle in transmitter 10 when the voltage driving transmitter 10 is below a threshold voltage. As demonstrated graphically in FIG. 4, the transmitter pulse repetition groups diagram for a good battery condition shown at diagram 60 illustrates that individual pulses 66 are transmitted as a pulse group 62, which is defined a total group duration of 210 μs (microseconds). Pulse group 62 is repeated again after a pulse group delay period of 12.3 milliseconds shown at 64.

Low battery pulse diagram 70 shown in FIG. 4 uses the same pulses and pulse group design with the exception of a group pulse group timing delay changed to 14.3 milliseconds at 72 when said threshold voltage of the battery in transmitter 10 falls below the design value. Such a favorable change in power duty cycle when the battery is already below the threshold voltage helps to increase the battery life of the system in a low voltage condition thereby allowing longer lasting low battery signaling before transmitter 10 fails to operate from a battery reaching the end of its useful life.

As shown in FIG. 3, system 40 contains a buzzer activation means which provides signaling when transmitter 10 (shown in FIG. 1) is in the low battery mode. When transmitter 10 has a low battery voltage, it extends the period between pulse groups 62 as shown in FIG. 4. In such a manner, the buzzer means 48 activates. If desired, microcontroller means 44 in receiver system 40 can lock out operation of controller 20 thereby preventing operation of door 16 until the battery in transmitter 10 is replaced. In a wireless environment, it is important to extend the operational time of the system monitoring the obstruction path for as long as possible so that an operator or system maintenance person is alerted that the battery in transmitter 10 should be changed prior to the time that the battery fails entirely. Allowing a low voltage condition in transmitter 10 to be signaled a long period of time assures that the low voltage condition will be noticed and corrected if even if it occurs at a time when any warning by buzzer activation means 48 would go unheeded for several days if there are no human operators immediately available to take notice of the alarm condition.

Figure 5:
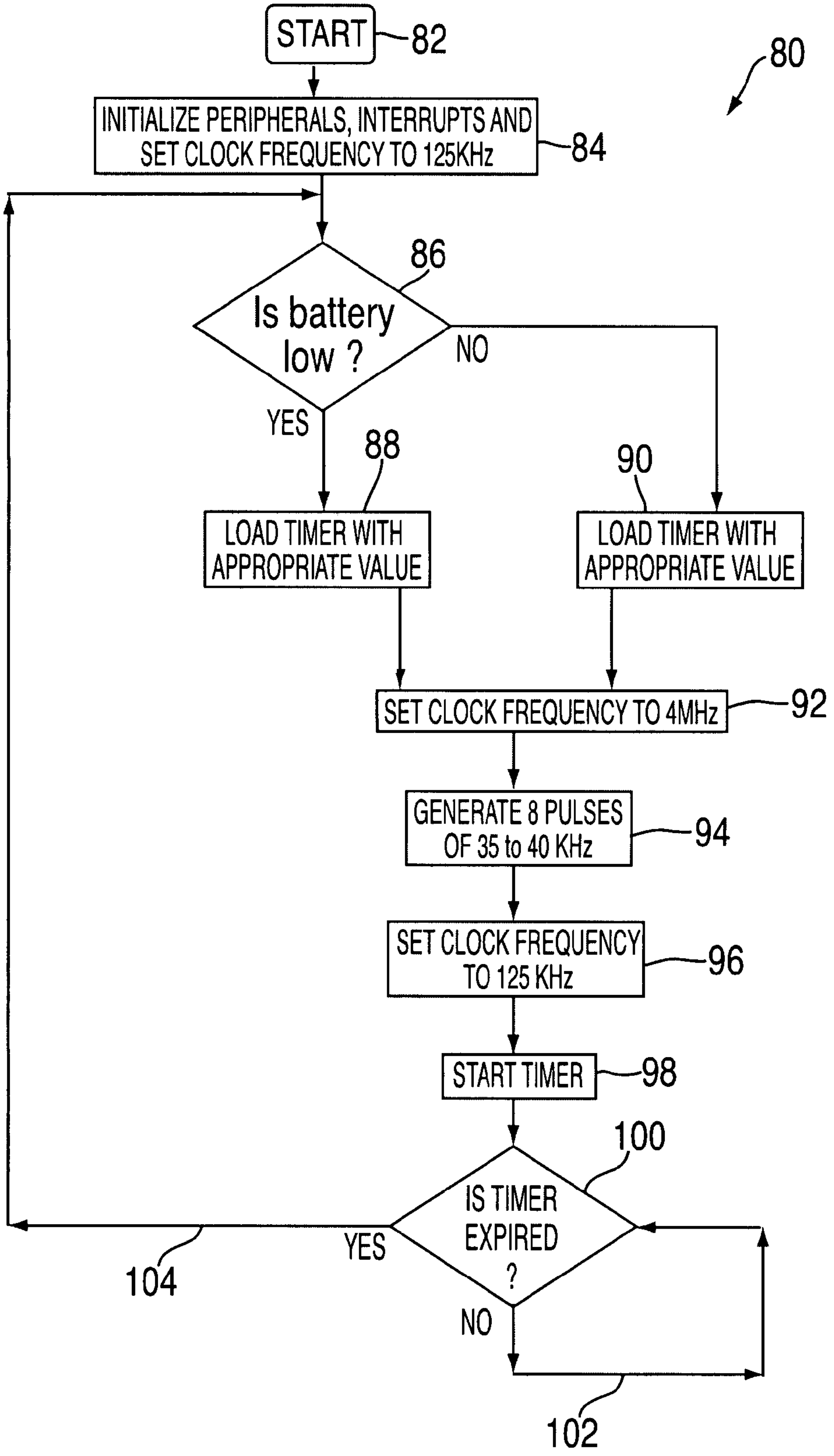
FIG. 5 is a block diagram illustrating the software function of the wireless photo eye transmitter.

FIG. 5 demonstrates the operation of the control software which can be effectively used to carry out the objectives of the present invention. A block diagram of control code system 80 depicted in FIG. 5 demonstrates the flow of the firmware used in the present invention. At system start 82, control code system 80 initializes peripherals, interrupts and sets the clock frequency to 125 KHz at 84. The system then determines whether the battery of transmitter 10 is low at 86. If transmitter 10's battery is not low, a selection is made to load a timer with the appropriate value at 90. If transmitter 10's battery is low, the system will decide to load the timer with an appropriate value 88. It can be appreciated that the selection of the appropriate values at timer 90 is shown in pulse diagram 60. The appropriate value at a low battery 88 is depicted in low battery pulse diagram 70 in FIG. 4. The selection of the path to load the correct timer is a function of battery voltage.

Returning to FIG. 5, regardless of whether there is a high or low battery condition, transmitter control code system 80 then sets a clock frequency to 4 MHz at 92. The system then generates 8 pulses in a frequency range of 35 to 40 KHz (depending on design discretion in the application) at 94 and thereafter selects a clock frequency of 125 KHz at 96. A start timer is then activated at 98 and a decision is made at 100 as to whether the timer has expired at logic branch 100 to hold a condition of control code system 80 in a loop 102 if the timer has not expired but thereafter cycling back to the input of low battery condition monitoring 86 through path 104 as described.

System clock used in the wireless transmitter system 30 is programmable. The code applied uses two types of internal clocks as described above. The first clock uses a clock rate of 125 KHz and the second clock uses a rate of 4 MHz. The 125 KHz is the slowest stable clock and is used during program initialization and also to run the two timers described of 12.3 milliseconds and 14.3 milliseconds. Power consumption of the invention is reduced by using a slower clock speed for most of the program execution described graphically in FIG. 5. Four (4) MHz clock speed is used for generating eight (8) pulses in a frequency range of 35 to 40 KHz.

Although the invention has been described in accordance with the preferred embodiment and a useful alternative embodiment, it will be appreciated by those skilled in the art that the application of the present invention is useful in a variety of configurations and designs not specifically described above. All such designs and applications are considered to be within the scope of the present disclosure, and the invention is applicable across a wide variety of applications. Such applications are considered within the scope and spirit of the present invention.

What is claimed is:

1. A motorized door opening system comprising;

detection means to continuously monitor the obstruction path of said motorized door by periodic signaling, including a wireless photoelectric transmitter means wherein said wireless transmitter monitors its battery power source and selectively switches from a first signaling state to a second signaling state to indicate reduced battery condition in said transmitter;

said detection means further including a photoelectric receiver means which continues to monitor obstructions and constructions regardless of whether said transmitter means is in said first or second state;

wherein further said second state is comprised of a longer time period between said periodic signaling;

wherein further said periodic signaling is comprised of transmission of timed groups of signaling pulses, said groups spaced a predetermined amount to signify a good battery condition in said transmitter, and thereafter changing said transmitted control signal at longer intervals between said pulse groups when said transmitter is in a low battery condition state.

2. A method of controlling a motorized door opening system which includes a motor and a control circuit to operate the motor, said motorized door opening system including means for detecting obstructions in the path of said motorized door that are selectively switchable from a first state wherein said detecting means utilizes a signaling duty cycle with higher power consumption, and a second state wherein said transmitter means switches to signaling with a lower duty cycle of power consumption comprising the steps of:

activating said control circuit;

determining whether the battery voltage of said transmitting means is in a first state signaling a good battery;

transmitting a series of timed pulse groups with predetermined pulse rates and pulse group spacing to designate said good battery condition;

detecting that said transmitter battery had been reduced to a low battery condition state;

thereafter switching said transmitter pulse rate to longer periods between said pulse groups to signal a low battery condition;

and detecting said low battery condition by recognition in the change in said timing between said pulse groups to signal a low battery condition.

3. A system for monitoring transmitter battery voltage in a wireless environment comprised of a wireless transmitter to provide a light transmitter signal to detect obstructions in the light transmission path omitted from said transmitter in which said transmitter is powered from a battery and including;

a photoelectric light receiver placed to receive the light transmission from said wireless light transmitter such as to detect any obstruction in the path between the said transmitter and said receiver;

a controller system for controlling operation of a function;

wherein further said transmitter generates a periodic pulse group with a known frequency and time period between the pulse groups in a first state during a high transmitter battery condition and pulse groups with a known frequency and different time delay between pulses in a second state representing a different battery voltage in said transmitter;

and wherein further said control system differentiates between said first state and said second state condition to activate a transmitter low battery condition.

4. The system of claim 3 wherein said controller is integrated into said receiver.

5. An automatic door obstruction monitoring system comprising:

a motor;

a movable door attached to said motor for selectable movement of the door;

a photoelectric transmitter to emit a beam of light across a selected path served by the movement of said movable door;

a photoelectric receiver placed in said selected path to receive said beam of light emitted by said transmitter;

a controller operatively connected between said receiver and said motor for controlling the operation of said motor;

wherein further said photoelectric transmitter is powered wirelessly and signals adequate power for its continued operation by emitting a signal to both monitor the obstruction path and confirm a good power condition of the transmitter, said signal comprised of a first timed pulse group of a measured duration between each group on regular time intervals to be received by said photoelectric receiver;

wherein further said photoelectric receiver receives said first timed pulse groups continuously unless said obstruction path is blocked;

wherein further said controller interprets said first timed pulse group as a good power condition;

wherein further said transmitter emits a second timed pulse group of a longer duration between each pulse group than said first timed pulse group duration when the power source for said transmitter reaches a predetermined depletion level;

wherein further said controller causes an indication of the low power condition of the said transmitter upon interpreting the change in state of the transmitted pulse group spacing from said first timed group to said second timed group.

6. The system of claim 5 wherein further said controller is integrated into said receiver.

* * * * *